(12) United States Patent
Yu

(10) Patent No.: US 12,291,399 B1
(45) Date of Patent: May 6, 2025

(54) RADIO FREQUENCY IDENTIFICATION (RFID)-BASED AUTOMATED SORTING VEHICLE FOR REAL-TIME ORDER VERIFICATION

(71) Applicant: WUXI HYESOFT SOFTWARE TECHNOLOGY CO., LTD., Jiangsu (CN)

(72) Inventor: Liqun Yu, Jiangsu (CN)

(73) Assignee: WUXI HYESOFT SOFTWARE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/017,276

(22) Filed: Jan. 10, 2025

Related U.S. Application Data

(63) Continuation of application No. PCT/CN2024/082675, filed on Mar. 20, 2024.

(30) Foreign Application Priority Data

Apr. 4, 2023 (CN) .......................... 202310354714.1

(51) Int. Cl.
  *G06F 7/00* (2006.01)
  *B65G 1/137* (2006.01)
  *G06Q 10/087* (2023.01)

(52) U.S. Cl.
  CPC ......... *B65G 1/1373* (2013.01); *G06Q 10/087* (2013.01)

(58) Field of Classification Search
  CPC .......................... B65G 1/1373; G06Q 10/087
  USPC ......................................... 700/213–216, 228
  See application file for complete search history.

(56) References Cited

U.S. PATENT DOCUMENTS

2020/0047218 A1* 2/2020 Cherry .................... B07C 3/14
2024/0004391 A1* 1/2024 Galluzzo ............. B65G 1/1373

FOREIGN PATENT DOCUMENTS

| CN | 104933381 A | 9/2015 |
|----|-------------|--------|
| CN | 104978646 A | 10/2015 |
| CN | 105512847 A | 4/2016 |
| CN | 106395231 A | 2/2017 |
| CN | 107096722 A | 8/2017 |
| CN | 209417770 A | 9/2019 |
| CN | 110458411 A | 11/2019 |

(Continued)

*Primary Examiner* — Yolanda R Cumbess
(74) *Attorney, Agent, or Firm* — Rondaus PLLC; George Liu

(57) ABSTRACT

Disclosed is an RFID-based automated sorting vehicle for real-time order verification, belonging to the technical field of order picking. The automated sorting vehicle is equipped with a picking processor, an RFID reader, a printer, a headphone and a plurality of cargo box placement locations, and an indicator is provided at each cargo box placement location. The picking processor can pre-store the storage location information of all items in the warehouse center. After importing the order fulfillment information into the picking processor, the picking processor generates picking instructions based on the order. During the order fulfillment process, the picking processor ensures the accuracy of item selection and placement by the picking personnel through the picking instructions and indicators. The picking processor also verifies the correctness of item selection by cross-referencing the item information read by the RFID reader with the content of the issued instructions.

8 Claims, 3 Drawing Sheets

(56) References Cited

FOREIGN PATENT DOCUMENTS

| CN | 111113365 A | 5/2020 |
| CN | 211468812 U | 9/2020 |
| CN | 211956522 U | 11/2020 |
| CN | 114130673 A | 3/2022 |

* cited by examiner

RADIO FREQUENCY IDENTIFICATION (RFID)-BASED AUTOMATED SORTING VEHICLE FOR REAL-TIME ORDER VERIFICATION

CROSS-REFERENCE TO RELATED APPLICATIONS

This application is a continuation of International Application No. PCT/CN2024/082675, filed on Mar. 20, 2024, which claims priority to Chinese Patent Application No. 202310354714.1, filed on Apr. 4, 2023. All of the aforementioned applications are incorporated herein by reference in their entireties.

TECHNICAL FIELD

The present disclosure relates to a Radio Frequency Identification (RFID)-based automated sorting vehicle for real-time order verification, belonging to the technical field of order picking.

BACKGROUND

An RFID-based automated sorting vehicle is a transportation tool used by picking personnel for order picking in a warehouse. It is equipped with an RFID reader/writer. Picking personnel select corresponding items from the warehouse based on the picking list and place them in the RFID-based automated sorting vehicle, which then transports all the items listed on the picking list to the next process area.

Currently, RFID-based automated sorting vehicles serve merely as carriers for items, and their RFID reader/writers can only record the information of the items picked. In other words, they can only passively record item information and do not have the capability to verify it. Picking personnel must manually check the items against the picking list. If there are errors, they can only be identified through subsequent verification procedures that match the items in the RFID-based automated sorting vehicle with those on the picking list. In large-scale warehousing centers with a wide variety of items, such as clothing warehouses where clothing comes in different colors, sizes, and types, relying solely on manual checking results in a high error rate. Furthermore, if the picking personnel leaves for a moment during the picking process or is replaced by another picking personnel, the error rate increases.

The aforementioned risks of errors are only for single-order picking. If a picking personnel uses one RFID-based automated sorting vehicle to pick items for a plurality of orders simultaneously, the error rate is even higher. Besides the issue of picking the wrong items, there is also the problem of distinguishing items between orders. These issues directly lead to reduced picking efficiency and decreased order processing efficiency in the warehousing center, among other problems.

SUMMARY

To address the existing issues, the present disclosure provides an RFID-based automated sorting vehicle for real-time order verification, eliminating the need for manual verification by picking personnel who only act as operators.

An RFID-based automated sorting vehicle for real-time order verification, wherein the RFID-based automated sorting vehicle is equipped with a picking processor, an RFID reader and a corresponding RFID scanning area and a printer; the RFID reader is used to read an RFID tag information of items placed within the RFID scanning area; wherein the RFID reader and the printer are connected to the picking processor via a wireless network or a data transmission line; the picking processor pre-stores the storage location information of all items in a warehousing center; and the picking processor is used to generate corresponding picking instructions based on the imported order fulfillment tasks and to verify the correctness of the ordered items against the item information read by the RFID reader.

Optionally, the RFID-based automated sorting vehicle is equipped with S cargo box placement locations, where S>1; and an indicator is provided at each cargo box placement location; and the indicator is connected to the picking processor via a signal line to assist with the picking instructions by indicating the corresponding cargo box placement location to the picking personnel.

Optionally, the picking processor is further equipped with a display screen.

Optionally, the picking processor is further equipped with a headphone and a voice interaction system, allowing the picking personnel to interact with the picking processor through the headphone and the voice interaction system.

Optionally, the RFID-based automated sorting vehicle is further equipped with a weighing sensor device and/or a camera device, which are connected to the picking processor via the wireless network or the data transmission line; when equipped with the weighing sensor device, each of the S cargo box placement locations is equipped with a weighing sensor device, and the weighing sensor device transmits the real-time sensed weight to the picking processor via a data transmission line, allowing the picking processor to determine whether the picking personnel have placed the items correctly based on the weight changes at the corresponding cargo box placement location; and when equipped with the camera device, the camera device is arranged above the RFID-based automated sorting vehicle in a position where the camera device is arranged to simultaneously capture images of the S cargo box placement locations, and AI image recognition is used to judge whether the picking personnel have placed the items correctly.

Optionally, the RFID-based automated sorting vehicle further includes a replaceable rechargeable battery to provide power to the picking processor, the RFID reader, the printer, the indicator, the weighing sensor device and/or the camera device.

Optionally, the RFID-based automated sorting vehicle further includes a vehicle frame body, and the vehicle frame body is configured as a single-layer or multi-layer structure based on actual application scenario requirements.

Optionally, the indicator is an indicator light or an electronic display board; and when the RFID-based automated sorting vehicle is fulfilling the plurality of orders simultaneously, the electronic display board displays different symbols to help the picking personnel distinguish between the orders.

Optionally, the RFID-based automated sorting vehicle adopts a multi-wheel structure, including a three-wheel structure, a four-wheel structure, and a structure with three main wheels and two small supporting wheels; in the structure with three main wheels and two small supporting wheels, two main wheels and two small supporting wheels are located at the four corners of the bottom of the RFID-based automated sorting vehicle, and the main wheels are at a front and the two small supporting wheels are at a back; and another main wheel is located in a middle of the two small supporting wheels.

Optionally, the RFID-based automated sorting vehicle is equipped with a robotic arm and a driving device; the picking processor is equipped with automatic navigation functionality; the robotic arm and the driving device are connected to the picking processor via signal lines; and the RFID-based automated sorting vehicle automatically completes the order fulfillment under the drive of the driving device based on the navigation information.

The beneficial effects of the present disclosure are:

The present disclosure provides an RFID-based automated sorting vehicle for real-time order verification, equipped with a picking processor, an RFID reader and a corresponding RFID scanning area, a printer, a headphone and a plurality of cargo box placement locations. An indicator is provided at each cargo box placement location, and the picking processor can pre-store the storage location information of all items in the warehouse center. After importing the order fulfillment information into the picking processor, the picking processor generates corresponding picking instructions to guide the picking personnel in completing the order fulfillment. During the order fulfillment process, the picking processor ensures the accuracy of item selection and placement by the picking personnel through the picking instructions and indicators. The picking processor also verifies the correctness of item selection by cross-referencing the item information read by the RFID reader with the content of the issued instructions. Furthermore, weighing sensor device and/or camera device can be installed to further verify the item storage location through weight detection or AI image recognition. Therefore, this RFID-based automated sorting vehicle maximizes the accuracy of order fulfillment and completely eliminates the need for manual verification.

BRIEF DESCRIPTION OF THE DRAWINGS

In order to more clearly illustrate the technical solutions in the embodiments of the present disclosure, the drawings needed to be used in the description of the embodiments will be briefly introduced below. Obviously, the drawings in the following description are only some embodiments of the present disclosure, and for a person of ordinary skill in the art, other drawings can also be obtained based on these drawings without exerting creative efforts.

DETAILED DESCRIPTION OF THE EMBODIMENTS

In order to make the objectives, technical solutions and advantages of the present disclosure more clear, the embodiments of the present disclosure will be further described in detail below with reference to the accompanying drawings.

Embodiment 1

Figure 1:
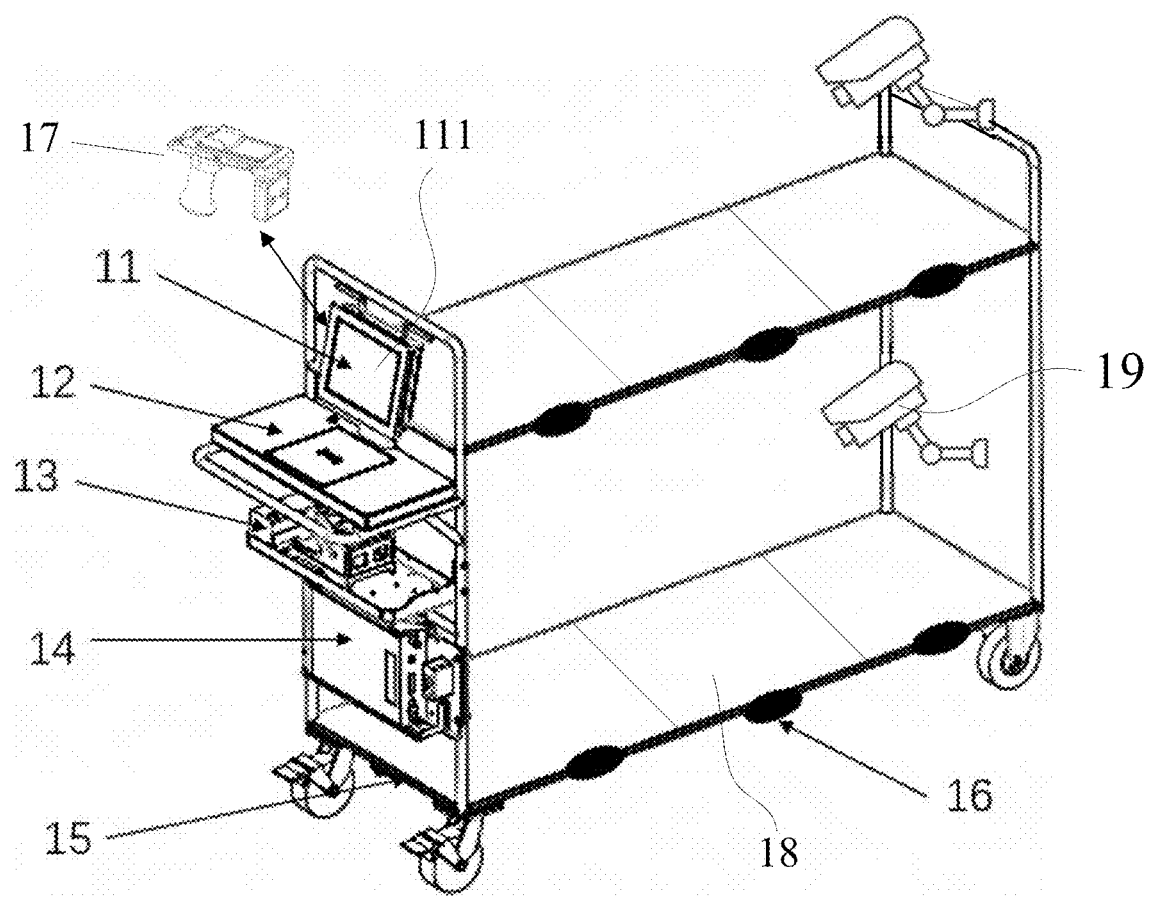
FIG. 1 is a three-dimensional diagram of the RFID-based automated sorting vehicle for real-time order verification provided by the present disclosure.

This embodiment provides an RFID-based automated sorting vehicle for real-time order verification, as illustrated in FIG. 1. The RFID-based automated sorting vehicle is equipped with a picking processor 11, an RFID reader 17 and a corresponding RFID scanning area 12, a printer 13 and an indicator 16. The picking processor 11 is equipped with a display screen 111, the display screen 111 can either be a standalone screen connected to the picking processor 11 via a wireless network, a data transmission line, or Bluetooth, or the display screen 111 can be integrated directly into the picking processor 11. By optimizing the RFID antenna to control the reading range of the RFID reader 17, the system ensures that only items placed within the RFID scanning area 12 are read, avoiding misreads from items on shelves, and enabling simultaneous scanning of a plurality of items. The RFID reader 17 and the printer 13 can connect to the picking processor 11 through the wireless network or the data transmission line. The indicator 16 is connected to the picking processor 11 via a signal line.

In practical applications, the picking processor 11 can be a mobile handheld device, such as a tablet computer; alternatively, the picking processor 11 can be a fixed computer installed on an RFID-based automated sorting vehicle, equipped with an input keyboard and a display according to actual needs. The display screen 111 can be a mobile interactive display screen.

Figure 3:
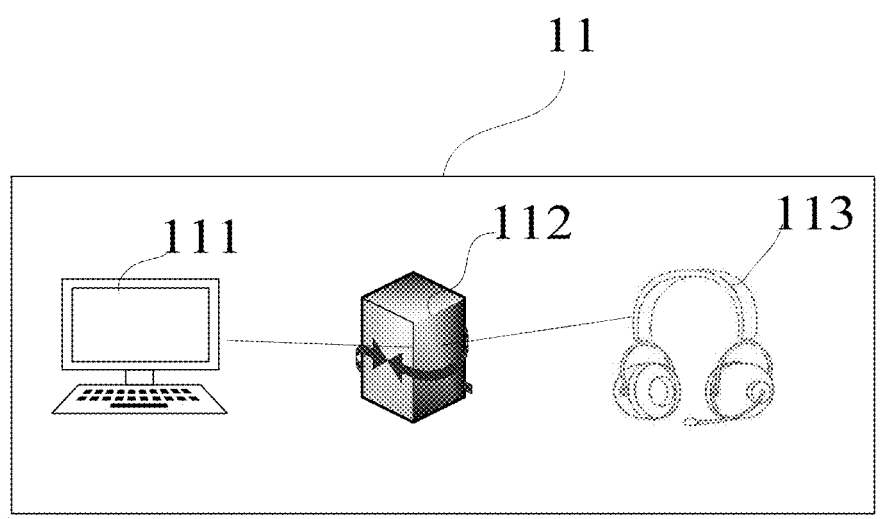
FIG. 3 is a structural diagram of the picking processor provided by the present disclosure.

As shown in FIG. 3, the RFID-based automated sorting vehicle 1 is further equipped with a voice interaction system 112 and a headphone 113. The picking personnel can engage in simple voice interactions with the picking processor 11 through the headphone 113, which can be configured as a wired headphone, a Bluetooth headphone, or other wireless headphones based on the specific scenario. The picking processor 11 generates corresponding picking instructions based on the imported order fulfillment tasks and reminds the picking personnel to perform the relevant operations in real-time through the headphone 113.

The RFID-based automated sorting vehicle 1 further includes a vehicle frame body 15, and the vehicle frame body 15 is configured as a single-layer or multi-layer structure based on actual application scenario requirements. In FIG. 1, the vehicle frame body 15 is illustrated with a two-layer structure as an example, equipped with S cargo box placement positions 18. An indicator 16 is provided at each cargo box placement location 18. The indicator 16 can be either an indicator light or an electronic display board to assist with the picking instructions issued by the picking processor 11 by indicating the corresponding item storage location to the picking personnel.

The RFID-based automated sorting vehicle 1 is also equipped with a replaceable rechargeable battery 14 to provide power to the picking processor 11, the RFID reader 17, the printer 13, the indicator 16 and other components.

To address the potential issue of placing items incorrectly into cargo boxes meant for other orders when fulfilling a plurality of orders simultaneously, the RFID-based automated sorting vehicle 1 is further equipped with a weighing sensor device 20 and/or a camera device 19. When equipped with the weighing sensor device 20, each of the S cargo box placement locations 18 is equipped with the weighing sensor device 20, and the weighing sensor device 20 transmits the real-time sensed weight to the picking processor 11 via a data transmission line, allowing the picking processor 11 to determine whether the picking personnel have placed the items correctly based on the weight changes at the corresponding cargo box placement location 18. When equipped with the camera device 19, the camera device 19 is arranged above the RFID-based automated sorting vehicle in a position where the camera device 19 is arranged to simultaneously capture images of the S cargo box placement locations 18, and AI image recognition is used to judge whether the picking personnel have placed the items correctly.

The picking processor 11 can pre-store the storage locations of all items in the warehousing center. Before using the RFID-based automated sorting vehicle 1 for picking, the picking task information needs to be imported into the picking processor 11. The picking task includes the item information for the plurality of orders to be processed. The picking processor 11 generates corresponding picking instructions based on the picking task to enable the picking personnel to complete the picking according to picking instructions. Specifically, using the RFID-based automated sorting vehicle 1 shown in FIG. 1 as an example, which is equipped with S=6 cargo box placement positions 18 and the picking task also includes 6 orders, the process is described as follows:

After entering their employee ID, the picking personnel click "Start Picking" on the interactive display screen 111. At this point, the picking processor 11 issues picking instructions, prompting the picking personnel to retrieve cargo boxes of the corresponding specifications for orders one to six and place them at the corresponding cargo box placement positions 18. For example, if the picking instruction is "Please retrieve an A-sized cargo box and place it at the first position on the upper layer," the indicator light at the first position on the upper layer of the RFID-based automated sorting vehicle will illuminate, indicating to the picking personnel to place the A-sized cargo box there.

During the picking process, the picking processor 11 issues a picking instruction to the picking personnel, prompting them to "Please proceed to the Pth storage location on the first row of shelves." Upon arriving at the specified storage location, the picking personnel can reply "Arrived" through the voice interaction system 112. At this point, the picking processor 11 issues the picking instruction: "Please retrieve 3 units of item B." The picking personnel then take 3 units of item B from the storage location and place them in the RFID scanning area 12. The RFID reader 17 then reads the item information and displays the result on the screen, while also playing a corresponding voice command. If there is an error in the item information—whether it's a shortage, excess, or incorrect item—the system will provide specific feedback. For example, if the picking personnel only take 2 units, after the RFID reader 17 reads the item information, the picking processor 11 will verify and issue the instruction: "You have retrieved 2 units of item B. Please retrieve 1 more unit." If the item information is correct, the picking instruction will be: "Please place the 3 units of item B at the first position on the upper layer." Simultaneously, the indicator light at the first position on the upper layer of the RFID-based automated sorting vehicle 1 will illuminate. If the picking personnel do not place the items in the correct position, the RFID-based automated sorting vehicle will also issue a prompt. This function is achieved through the use of the weighing sensor device 20 and/or the camera device 19.

In the aforementioned order fulfillment process, the picking processor ensures the accuracy of item selection and placement by the picking personnel through the picking instructions and indicators. The picking processor also verifies the correctness of item selection by cross-referencing the item information read by the RFID reader 17 with the content of the issued instructions. Additionally, the picking processor conducts a secondary check of item storage location through weight detection or AI image recognition, thereby maximizing the accuracy of the picking process with the RFID-based automated sorting vehicle.

Furthermore, the interactive display screen 111 is set up to display the real-time picking progress, accompanied by corresponding voice commands. This allows picking personnel to continue with the picking process without any disruption even if they need to leave temporarily and return later, or if there is a change in picking personnel, eliminating the need for a handover of the picking status, thus enabling a seamless continuation of the picking process.

When the picking processor 11 detects that a cargo box at a certain location is full (based on the cargo box specifications and the placed item information), it alerts the picking personnel that "Cargo box is full. Do you need to print a cargo box code?" The picking personnel can choose "Print cargo box code" by clicking on the interactive screen or through the voice interaction system 112. The picking processor 11 then sends a print box code instruction to the printer 13 to print the cargo box code, the box code contains all item information and the corresponding order information within the cargo box, and the box code is marked with the sequence number of the cargo box for the corresponding order.

After the box code is printed, the picking processor 11 prompts the picking personnel to affix the box code to the corresponding cargo box (as indicated by the indicator 16), pack and seal the cargo box, and then place the cargo box in the nearest collection area 7. The collection area 7 can be set up at one end of the shelf aisle, and empty cargo boxes can also be placed there (packed and sealed cargo boxes and empty cargo boxes can be placed on different pallets), allowing the picking personnel to pick up an empty cargo box to continue with the picking process after placing a sealed cargo box in the collection area.

When the picking processor 11 detects that all items for a specific order (let's assume it's Order One) have been fully picked, regardless of whether the last cargo box is completely filled or not (the picking plan usually specifies cargo boxes of appropriate sizes based on the order volume, but sometimes they may not be exactly filled), it will prompt the picking personnel with "Order One has been fully picked. Please print the box code." The picking personnel will then follow the prompt to print the box code and affix it to the corresponding cargo box at the designated location. After packing and sealing the box, it will be placed in the nearest collection area 7.

When the picking personnel arrive at the final picking location for the current picking task and complete the picking for that location, the picking processor 11 checks if any orders are in a stockout status. If there are no orders in stockout, the picking processor 11 resets to its initial state and remains idle until the picking personnel click "Start Picking" on the interactive display screen 111 to initiate a new picking task.

During the picking process, if the picking personnel discover a shortage of items required for an order, they will send a "replenishment request" to the data processing center of the warehousing center through the picking processor 11. The replenishment request includes the quantity of items out of stock and the corresponding order information for those items. The data processing center will then notify the warehouse staff to replenish the stock promptly. After replenishment, the warehouse staff will send a replenishment completion message to the data processing center, which will update the status of the aforementioned "replenishment request" to "completed". After sending the replenishment request, the picking processor 11 will continue to prompt the picking personnel to pick the remaining items for the order. Once all picking tasks for all orders in the batch are completed, the picking personnel can click "Picking Completed" on the interactive screen. Upon receiving this click, the picking processor 11 will check if any orders are still in a stockout status. If there are, it will retrieve the status of the "replenishment request" sent from the data processing center. If the status is "completed", the picking processor 11 will prompt the picking personnel to go to the corresponding storage location to complete the picking of the missing items, followed by the subsequent steps of printing the box code, sealing the box, and placing it in the nearest collection area 7. If the status of the "replenishment request" is "pending", the picking processor 11 will record the stockout information and prompt the picking personnel to place the cargo box in a designated area (a stockout area can be set up near the collection area 7) for subsequent handling by the replenishment staff. At the same time, it will upload the stockout information to the data processing center.

In addition to completing the aforementioned picking tasks, the picking processor 11 also monitors the battery level, printer paper status, and indicator light functionality in real-time. In case of any abnormalities, the corresponding error messages will be displayed on the interactive display screen 111.

When picking personnel use the RFID-based automated sorting vehicle 1 for picking, they merely act as executors performing tasks such as retrieving items, placing items, affixing box codes, triggering buttons, packing cargo boxes, placing cargo boxes, and pushing the vehicle. Therefore, the RFID-based automated sorting vehicle 1 can also be equipped with a robotic arm 23 to perform these tasks automatically. Additionally, the picking processor 11 is equipped with automatic navigation functionality, and the RFID-based automated sorting vehicle 1 is equipped with a driving device 24, allowing the RFID-based automated sorting vehicle automatically completes the order fulfillment under the drive of the driving device 24 based on the navigation information.

Figure 2:
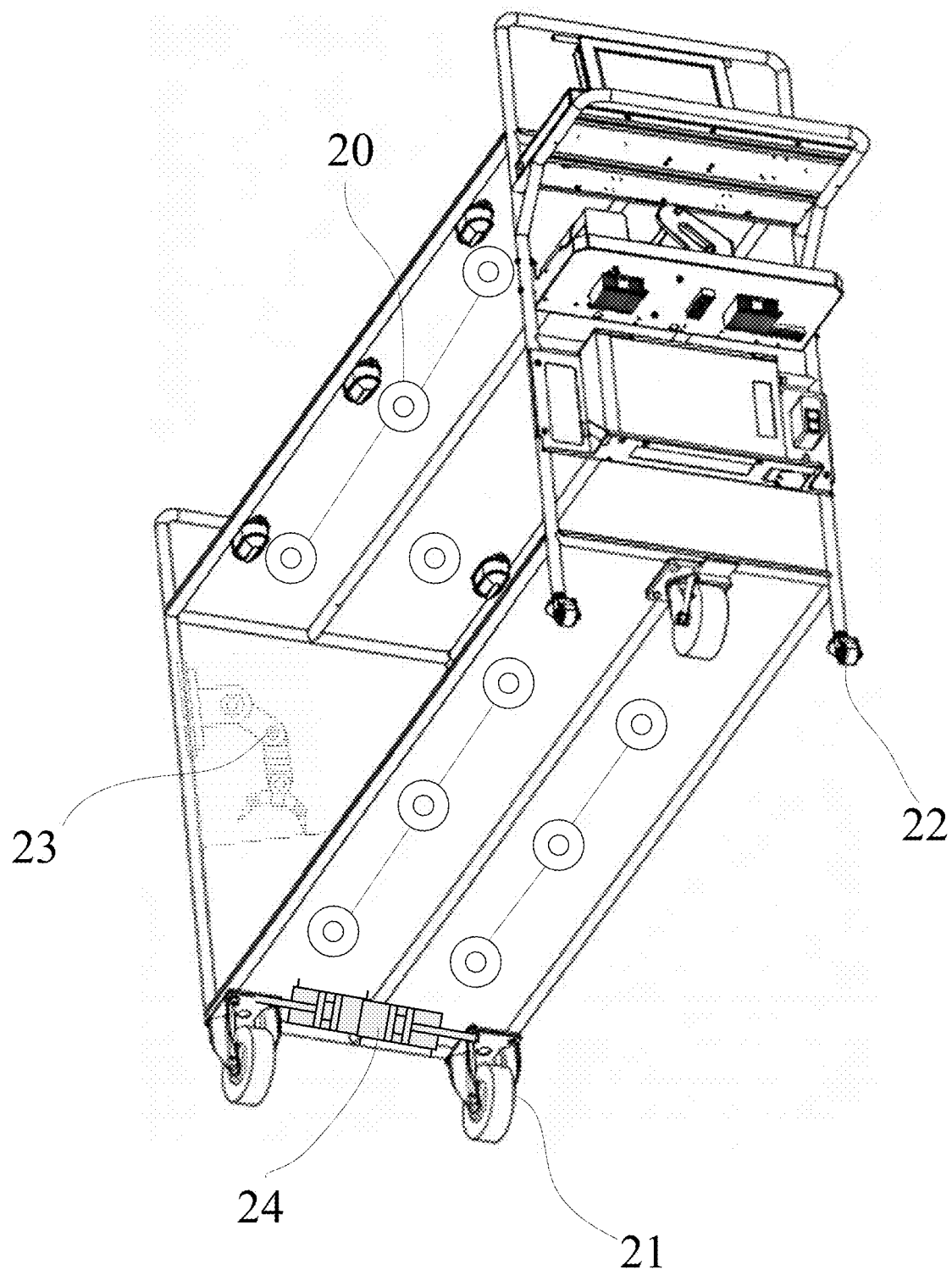
FIG. 2 is a schematic diagram of the wheel distribution at the bottom of the RFID-based automated sorting vehicle for real-time order verification provided by the present disclosure.

The RFID-based automated sorting vehicle 1 can be configured with a general three-wheel or four-wheel structure based on actual application scenarios. Besides these general structures, an alternative design featuring three main wheels 21 and two small supporting wheels 22 can also be adopted. As shown in FIG. 2, two main wheels 21 and two small supporting wheels 22 are located at the four corners of the bottom of the RFID-based automated sorting vehicle, and the main wheels 21 are at a front and the two small supporting wheels 22 are at a back; and another main wheel 21 is located in a middle of the two small supporting wheels 22. The two main wheels 21 at the front can be fixed-direction wheels, while the main wheel 21 at the back can be a caster wheel to facilitate easy steering of the RFID-based automated sorting vehicle 1 by the picking personnel. The two small supporting wheels 22 at the back serve to support the vehicle and prevent the vehicle from tipping laterally, while also aiding in turning.

Some steps in the embodiments of the present disclosure can be implemented using software, and the corresponding software programs can be stored in readable storage media such as optical discs or hard disks.

The above are only preferred embodiments of the present disclosure and are not intended to limit the present disclosure. Any modifications, equivalent substitutions, improvements, etc. made within the spirit and principles of the present disclosure shall be included in the protection scope of the present disclosure.

What is claimed is:

1. An Radio Frequency Identification (RFID)-based automated sorting vehicle for real-time order verification, wherein the RFID-based automated sorting vehicle is equipped with a picking processor, an RFID reader and a corresponding RFID scanning area and a printer; the RFID reader is used to read an RFID tag information of items placed within the RFID scanning area; wherein the RFID reader and the printer are connected to the picking processor via a wireless network or a data transmission line; the picking processor pre-stores the storage locations of all items in a warehousing center; and the picking processor is used to generate corresponding picking instructions based on the imported order fulfillment tasks and to verify the correctness of the ordered items against the item information read by the RFID reader;

the RFID-based automated sorting vehicle is equipped with S cargo box placement locations, where S>1, enabling simultaneous fulfillment of a plurality of orders; each cargo box placement location corresponds to an order; an indicator is provided at each cargo box placement location; the indicator is connected to the picking processor via a signal line to assist with the picking instructions by indicating the corresponding cargo box placement location and item storage location to the picking personnel; and the specifications of the cargo boxes are determined based on the corresponding orders;

the printer receives a print box code instruction from the picking processor; the box code contains all item information and the corresponding order information within the cargo box, and the box code is marked with the sequence number of the cargo box for the corresponding order; after the box code is printed, the picking processor prompts the picking personnel to affix the box code to the corresponding cargo box, pack and seal the cargo box, and then place the cargo box in the nearest collection area; and the print box code instruction is issued when the picking processor detects that "the cargo box is full" or "the order fulfillment is complete"; and the RFID-based automated sorting vehicle is further equipped with a weighing sensor device and/or a camera device, which are connected to the picking processor via the wireless network or the data transmission line; when equipped with the weighing sensor device, each of the S cargo box placement locations is equipped with a weighing sensor device, and the weighing sensor device transmits the real-time sensed weight to the picking processor via a data transmission line, allowing the picking processor to determine whether the picking personnel have placed the items correctly based on the weight changes at the corresponding cargo box placement location; and when equipped with the camera device, the camera device is arranged above the RFID-based automated sorting vehicle in a position where the camera device is arranged to simultaneously capture images of the S cargo box placement locations, and AI image recognition is used to judge whether the picking personnel have placed the items correctly.

2. The RFID-based automated sorting vehicle according to claim 1, wherein the picking processor is further equipped with a display screen.

3. The RFID-based automated sorting vehicle according to claim 2, wherein the picking processor is further equipped with a headphone and a voice interaction system, allowing the picking personnel to interact with the picking processor through the headphone and the voice interaction system.

4. The RFID-based automated sorting vehicle according to claim 3, wherein the RFID-based automated sorting vehicle further includes a replaceable rechargeable battery to provide power to the picking processor, the RFID reader, the printer, the indicator, the weighing sensor device and/or the camera device.

5. The RFID-based automated sorting vehicle according to claim 4, wherein the RFID-based automated sorting vehicle further includes a vehicle frame body, and the vehicle frame body is configured as a single-layer or multi-layer structure based on actual application scenario requirements.

6. The RFID-based automated sorting vehicle according to claim 5, wherein the indicator is an indicator light or an electronic display board; and when the RFID-based automated sorting vehicle is fulfilling the plurality of orders simultaneously, the electronic display board displays different symbols to help the picking personnel distinguish between the orders.

7. The RFID-based automated sorting vehicle according to claim 6, wherein the RFID-based automated sorting vehicle adopts a multi-wheel structure, including a three-wheel structure, a four-wheel structure, and a structure with three main wheels and two small supporting wheels; in the structure with three main wheels and two small supporting wheels, two main wheels and two small supporting wheels are located at the four corners of the bottom of the RFID-based automated sorting vehicle, and the main wheels are at a front and the two small supporting wheels are at a back; and another main wheel is located in a middle of the two small supporting wheels.

8. The RFID-based automated sorting vehicle according to claim 1, wherein the RFID-based automated sorting vehicle is equipped with a robotic arm and a driving device; the picking processor is equipped with automatic navigation functionality; the robotic arm and the driving device are connected to the picking processor via signal lines; and the RFID-based automated sorting vehicle automatically completes the order fulfillment under the drive of the driving device based on the navigation information.

* * * * *